Feb. 23, 1971  E. A. NICOL ET AL  3,565,470
DEVICE FOR PROVIDING ADJUSTABLE POSITIONING OF WHEEL ON SHAFT
Filed Dec. 11, 1968  2 Sheets-Sheet 1

INVENTORS.
EDWARD A. NICOL.
LOUIS R. BROWN.
BY
*Ralzemond B. Parker*
ATTORNEY.

Feb. 23, 1971  E. A. NICOL ET AL  3,565,470
DEVICE FOR PROVIDING ADJUSTABLE POSITIONING OF WHEEL ON SHAFT
Filed Dec. 11, 1968  2 Sheets-Sheet 2
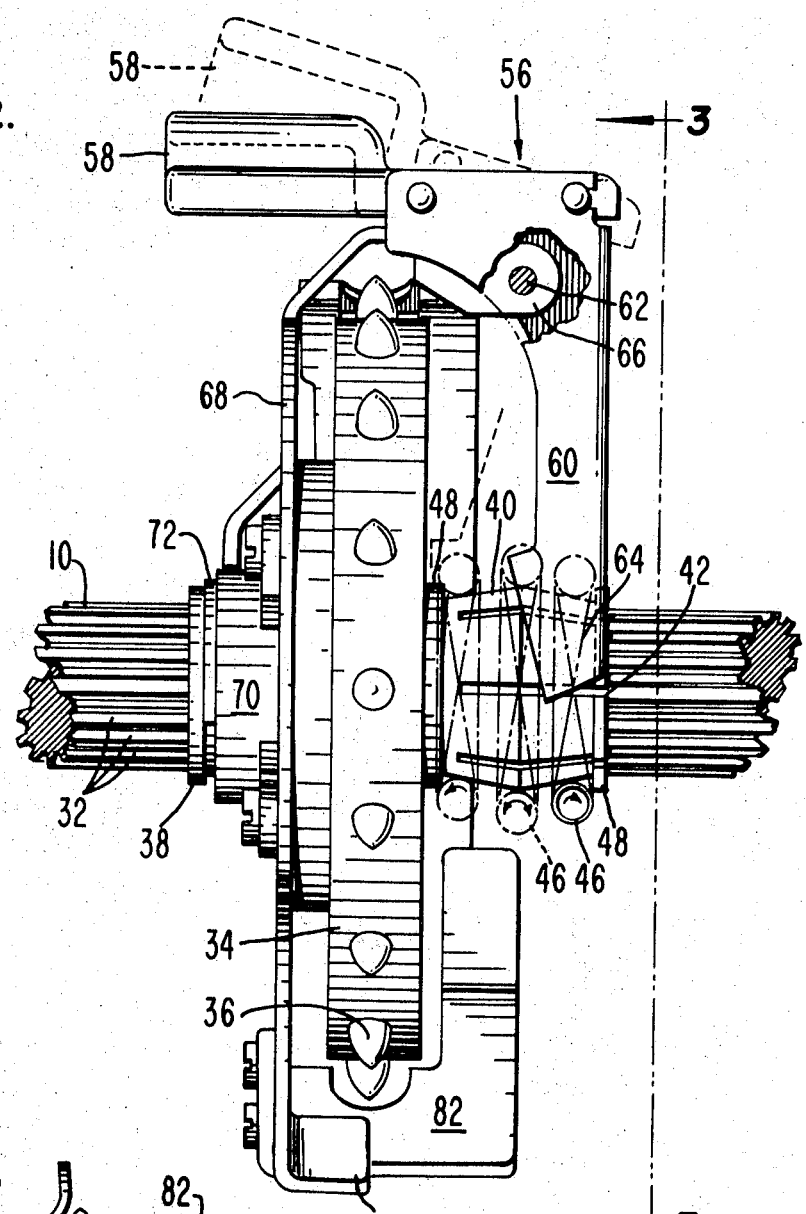
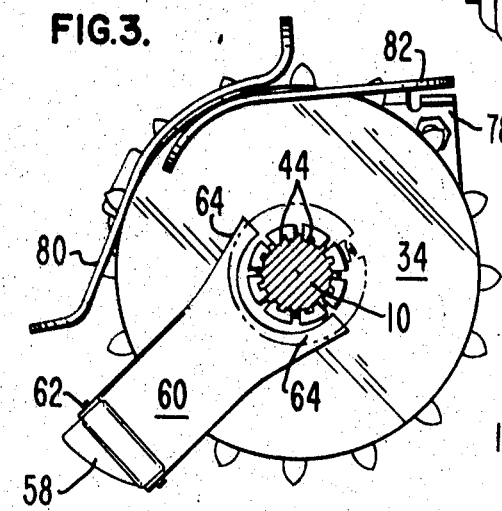
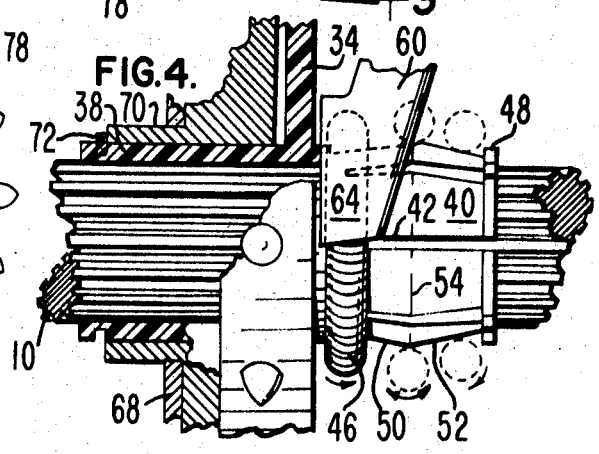

US United States Patent Office 3,565,470
Patented Feb. 23, 1971

3,565,470
DEVICE FOR PROVIDING ADJUSTABLE
POSITIONING OF WHEEL ON SHAFT
Edward A. Nicol, Farmington, and Louis R. Brown,
Livonia, Mich., assignors to Burroughs Corporation,
Detroit, Mich., a corporation of Michigan
Filed Dec. 11, 1968, Ser. No. 782,993
Int. Cl. F16d 1/06
U.S. Cl. 287—52
10 Claims

ABSTRACT OF THE DISCLOSURE

A provision for releasably clamping a wheel-like member against axially slidable movement on the shaft upon which it is mounted, which includes a sleeve or collet forming an axial extension of the wheel and a garter-type spring encircling the sleeve and exerting a resilient contractual force thereon. The sleeve is flexible and responds to the presence of the spring at its outer end to clamp the wheel to the shaft and at its inner end by releasing the wheel for slidable movement along the shaft. The garter spring affects a rolling motion as it moves along the sleeve, and a camber on the sleeve provides opposite slopes of descreasing diameters which under the influence of its contractual force causes the garter spring to propel itself with a snap action to either clamping or release position once it is shifted over the high point of the camber. Means is carried by the wheel for effecting shiftable movement of the garter spring.

SUMMARY OF THE INVENTION

This invention relates generally to wheel mountings on shafts and more particularly to an improved mechanism for locking and unlocking a wheel-like member onto a shaft for either preventing or permitting slidable movement thereof along the shaft. In the environment in which the invention is illustrated herein, the member is in the form of a paper feed wheel splined to a drive shaft for joint rotation therewith but axially slidable therealong to accommodate paper webs of different widths or for other adjustment purposes. The releasable locking mechanism includes a sleeve or collet forming an axial extension of the hub of the wheel and a spring element, preferably in the form of a toroid, such as a garter spring, which encircles the sleeve and applies a radially contractual force thereupon. For improving the gripping action, the sleeve is formed with longitudinally extending slits in the unsecured end section thereof to provide the desired radial flexibility and also formed with internal splines matching those of the shaft to provide greater surface contact therewith.

The garter spring is preferably formed of a helically coiled spring having its ends joined to form a ring. So designed, its individual convolutions will roll on the external surface of the sleeve while the spring applies a squeezing contractual pressure thereto. When the garter spring is positioned adjacent to the free or unsecured end of the sleeve, it constricts this flexible end portion of the sleeve upon the shaft with a grip sufficient to hold the wheel against forces normally employed to slide it along the shaft. When the garter spring is positioned adjacent to the secured end of the sleeve, the increased rigidity of the sleeve in this area prevents the spring from performing its contracting function thereby releasing the wheel for slidable movement on the shaft. A distinctive feature of the invention is the camber profile of the sleeve which provides slopes of increasing diameters rising from the clamp and release positions of the spring to a maximum diameter approximately midway therebetween. These slopes cooperate with the inherent proclivity of the garter spring to seek a smaller diameter and enables the spring to roll itself with a snap action to one or the other position following its displacement over the high point of the camber. The rolling characteristic of the snap action reduces the effort required to operate the device and the mechanical wear between the spring and sleeve. Moreover, its self-exerted constricting action assures retention of the spring in either clamp or release position against accidental dislodgement therefrom.

Another feature of the invention lies in the manner of controlling the movement of the garter spring. Independently journaled on the hub of the wheel, and therefore unaffected by its rotation, is a finger-like control for the operator which is shaped to straddle the garter spring but without impairing its joint rotation with the sleeve and wheel. By a simple easy movement of the finger, the straddling portion thereof engages and rolls the garter spring from one operating position on the sleeve up the camber to the high point thereof, whereupon the spring acts under its own contractual force to propel itself to the other operating position on the sleeve.

The above mentioned advantages, objects and other aspects of the invention will be further explained in the following description. For a more complete understanding of the invention, reference may be had to the following detailed description in conjunction with the drawings.

BRIEF DESCRIPTION OF THE DRAWINGS

FIG. 2 is an enlarged front elevation of one of the wheel assemblies illustrated in FIG. 1 and showing by full and dotted lines two positions of a control for clamping the wheel onto or releasing the wheel from the shaft;

FIG. 3 is a side elevation of the wheel assembly of FIG. 2 taken along line 3—3 thereof; and FIG. 4 is a fragmentary view of a part of the wheel and its collet and illustrating by full and dotted lines the movement of the garter spring on the collet.

DESCRIPTION OF THE PREFERRED EMBODIMENT

Figure 1:
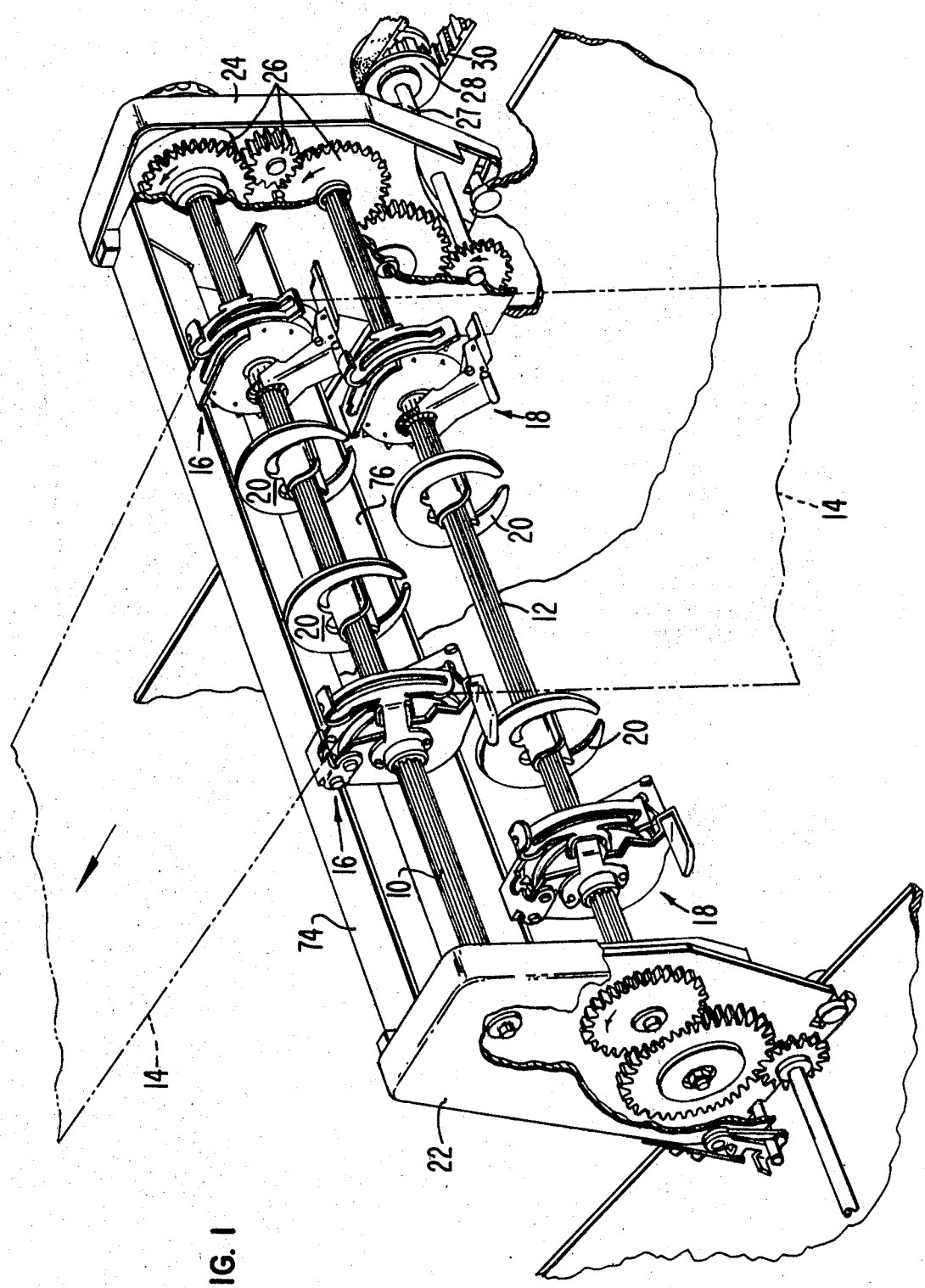
FIG. 1 is a perspective view of a paper web transport mechanism showing a plurality of feed wheel assemblies and associated splined drive shafts for guiding a paper web, each such wheel assembly embodying the invention for releasably locking the wheel to its respective splined shaft to either permit or prevent slidable movement of the wheel along the shaft.

Referring now to FIG. 1, there is shown a record medium transport mechanism comprising a plurality of pin feed wheel assemblies mounted on two splined shafts 10 and 12 for guiding an elongated record member exemplified by the paper web shown in dotted outline at 14. In FIG. 1 the web is fed over the upper shaft 10 and is trained around a pair of wheel assemblies generally indicated as 16—16, each of which includes a pin wheel engageable in sprocket holes (not shown) usually extending along each margin of the web. Either the same or a second paper web may be trained over the two pin wheel assemblies 18—18 of the second shaft 12, but this web is omitted from FIG. 1 for the purpose of clarity. Intermediate each pair of pin wheel assemblies are guides 20 which support the central part of the web and keep it from sagging. Reference may be had to the patent application in the name of Edward A. Nicol, Ser. No. 658,013, filed July 12, 1967, of common ownership herewith for a description of the intermediate paper supporting guides 20.

The splined shafts 10 and 12 are journaled in side frames 22 and 24 and may be driven by a train of gears 26 shown in the right frame 24 from a shaft 27 connnected through pulley 28 to an endless driving belt 30. The pin wheel assemblies are slidably mounted on their respective splined shafts for adjustment in either direction axially therealong. Such adjustment is desirable to accommodate different widths of paper webs or for other purposes. Once an adjustment has been made, these assemblies are then releasably locked in their adjusted position.

As previously mentioned, the invention is directed to the mechanism for locking and unlocking each such wheel assembly for preventing or permitting axial movement thereof along the drive shaft upon which it is mounted, and the remaining figures are directed to the details of a preferred embodiment of the invention for the feeding of elongated paper forms or webs and the like. However, it is to be understood that the releasable locking mechanism herein described and claimed is applicable to other structures slidably mounted on shafts which may drive them. Referring specifically to FIG. 2, a pin wheel assembly, such as one of the pair represented at 16 and 18 in FIG. 1, will be described. It is shown mounted as in FIG. 1 upon shaft 10 for joint rotation therewith through the provision of longitudinal splines 32 on the shaft which mesh with internal splines in the axial bore of the wheel member to be rotated thereby. In this embodiment, the wheel member is a pin wheel 34 carrying pins 36 around its peripheral flange for engaging in the sprocket holes of the paper web to be advanced thereby. Although the wheel proper may be formed of metallic material, it is preferred for this embodiment that it be constructed of a hardened plastic material extending radially inwardly to a hub 38 as shown in FIG. 4 which is splined to the shaft 10 for joint rotation therewith. The hub is preferably similarly formed of hardened plastic material and integrally joined to the wheel part 34 thereof. Forming an axial extension of the hub 38, and preferably composed of the same material and integrally connected thereto, is a collet or sleeve 40 whcih serves as an important operating element of the releasable clamping mechanism. One end of the sleeve is secured to the hub while the other end is free.

To increase its gripping action on the splined shaft, the outer end section of the sleeve or collet 40 is rendered flexible by the provision of a plurality of circularly spaced apart longitudinally extending slits 42 which, as shown, extend for the greater length of the sleeve and open out of the free or unsecured end thereof. To further improve this gripping action, the sleeve 40 is provided with internal splines as evidenced at 44 in FIG. 3, which interengage those of the shaft 10. This increases the surface contact of the sleeve with the shaft to improve the gripping action.

Encircling the sleeve 40 is a spring member 46 which, as shown, is in the form of a ring or garter and preferably toroidal in configuration. Preferably, also, the spring is formed of a helically coiled wire having its ends joined together to form a closed loop. The garter spring is initially dimensioned so that when mounted on the sleeve, it is stretched radially to fit the sleeve, and thus when installed it applies a radially contractual force tending to compress or collapse the sleeve upon the shaft. In the full line position of the spring in FIG. 2, it is positioned adjacent to the outer or free end of the sleeve, and a circular flange 48 on the sleeve serves as a stop limiting further outward travel of the spring thus forming a seat for the spring. In this position, the contractual force of the spring is sufficient to squeeze the flexible slitted end of the sleeve into tight clamping engagement with the splined shaft hereby holding the wheel assembly from sliding movement therealong. When the garter spring assumes a position adjacent to the inner secured end of the sleeve, as shown in full line in FIG. 4, the unslitted solid part of the sleeve is sufficiently rigid to resist the contractual force of the spring with the result that the wheel assembly is free to slide along the shaft. In this second operating position of the spring, the adjacent end 48 of the hub 38 serves as a stop limting further inward travel of the spring with respect to the wheel assembly.

It is evident that by varying the point of application of the garter spring 46, the degree of effectiveness of its gripping action can be varied. If the spring is positioned close to the hub 38 or solid portion of the sleeve 40, the gripping action on the shaft is minimized or nullified and the wheel assembly is free to slide along the shaft. If the spring is positioned close to the outer end of the sleeve where the latter's flexible moment arm is longest, the gripping action applied by the spring is most efficient and will clamp the wheel assembly to the shaft.

By designing the profile of the sleeve or collet to incorporate a camber which biases the spring to either extreme operating position, the spring will on its own roll in the direction of the decreasing diameter of the sleeve. The sleeve's camber profile is designed so that the garter spring remains in either extreme position unless shifted by the operator and also so that the separate convolutions of the spring will roll about the circular axis of the spring as it moves along the sleeve, thus minimizing both wear of these parts and the magnitude of the force required to shift the spring.

As shown in FIGS. 2 and 4, the sleeve exhibits two opposite inclined surfaces or slopes 50 and 52 which rise to a maximum diameter approximately midway of the sleeve as indicated at 54. In other words, the exterior surface of the sleeve takes the characteristic of two coaxial truncated cones having a common base, the latter being constituted by a plane intersecting the circular high point of the camber profile. As is indicated by the arrows applied to the garter spring in FIGS. 2 and 4, the spring will roll on its circular axis up and down the slope of the camber thus making it easier to shift the sleeve from one extreme operating position to the others. Moreover, because of this easy movement on the surface of the sleeve, the garter spring is self-operable to roll on its circular axis once it has been displaced past the high point of the camber with the result that it will roll down either conical slope with a snap-action to one or the other of the operating positions.

Although the garter spring may be grasped by the hand of the operator and shifted along the sleeve or collet 40, it is preferred to accomplish this operation from outside of the wheel assembly by a hand operated device generally indicated at 56 in FIG. 2 which is mounted for swinging movement between the full line and dotted line positions illustrated therein. The device comprises a hand engaging member 58 overlying the pin wheel 34 but clearing the pins thereof and a mechanical finger 60 extending along one side of the wheel assembly and terminating adjacent to the sleeve 40. The two parts of the device, namely members 58 and 60, are secured together for joint pivotal or rocking movement about an axis represented by a pin 62. The terminating end of the finger 60 adjacent to the sleeve is preferably bifurcated as shown in FIG. 3 to provide two similarly formed sections 64–64 which together straddle approximately one half of the garter spring. Furthermore, these straddling sections 64–64 of the finger are folded to loosely overlap opposite side portions of the coils of the spring, with the result that when the finger 60 is swung in either direction about the pivotal axis 62 it will engage and shift the garter spring on the collet in one or other direction. The loose relationship between the straddling portions of the arm 60 and the garter spring enables the latter to rotate jointly with the sleeve and wheel while the finger 60 and associated parts are held from rotation. Moreover, in whatever position the garter spring is moved by the finger mechanism 56, it will by virtue of its self-operable nature respond by yieldingly holding the pivotal parts 58 and 60 in either release or locked position thereby avoiding any need for a special provision for this purpose.

The garter spring controlling device 56 may be mounted on a support separate from the wheel assembly. However, in the embodiment of the invention illustrated herein, the device is mounted on the wheel assembly but in such a manner that relative rotation takes place therebetween. To this end, the pivotal pin 62 is mounted in the ears of an arm 66 which extends between the hand engaging part 58 and the wheel and is connected to a bracket which takes the form of a plate 68. The bracket plate has a hub 70 which is journaled on the hub 38 of the wheel as shown in FIG. 4. A split ring 72 is provided for locking the pin against axial movement away from the wheel.

In the operation of the mechanism, the spring shifting device 56 may be held from rotating with the wheel by abutting a stationary part of the web transport apparatus. Such a provision is illustrated in FIG. 1 where cross members 74 and 76 extend between the side frames 22 and 24 in parallel proximity to the drive shafts 10 and 12 respectively. These cross members are so positioned that regardless of the position on the drive shafts to which the wheel assemblies may be adjusted they will be abutted by a part of each assembly holding the same from rotating in the same direction as the wheel. Such a part of each wheel assembly may be an extension 78 of the bracket plate 68 which will strike one of the cross members 74 or 76. Although the web transport mechanism may be stopped during slidable adjustment of the wheel assemblies on their respective drive shafts, the easy operation of the garter spring and the convenience of the mechanical finger provision 56 enables the wheel assemblies to be released and slidably adjusted even while the drive shafts and wheels are rotating.

The bracket plate 68 of each wheel assembly may also serve other functions and is herein shown carrying paper web guiding elements 80 and 82 which do not form part of the present invention. These guiding elements overlie the periphery of the wheel and assists in holding the paper web 14 onto the pins of the wheel during operation of the transport mechanism.

What is claimed is:

1. In combination with a member axially slidable on a shaft, mechanism for releasably clamping the member to the shaft against such slidable movement comprising:

a sleeve secured at one end to the member in coaxial relation thereto and having the opposite end free, said sleeve being shaped to closely encircle the shaft and to have its free end radially flexible, said sleeve being shaped with a camber profile such that slopes of progressively decreased diameters extend from a maximum external diameter approximately midway of the sleeve toward the opposite ends thereof, and a ring-shaped spring element encircling the sleeve and exerting thereon a resilient contractual force, said spring element being movable over the camber profile on the sleeve from a position adjacent to the free end thereof to a position adjacent to the secured end thereof and being operable when in the free end position to contract the sleeve upon the shaft thereby clamping the member against slidable movement therealong whereas when the spring element is in the secured end position it is ineffective to provide such clamping action thereby releasing the member for sliding movement on the shaft.

2. The invention described in claim 1 characterized in that the sleeve is shaped with longitudinal slits to provide the radial flexibility therefor.

3. The invention described in claim 2 further characterized in that the spring element is in the form of a helically coiled garter spring having its ends joined in encircling relation to the sleeve, said garter spring being rollable along the sleeve and being self-operable with a snap action to roll on said slopes to either one of said two positions from the high point of the camber.

4. In combination with a wheel haivng its hub slidably splined to a drive shaft for joint rotation therewith, a locking device for releasably clamping the wheel to the drive shaft against such slidable movement comprising:

a sleeve composed of flexible material attached at one end to the wheel hub to form an axial extension thereof closely encircling the splined shaft, said sleeve having a plurality of slits extending longitudinally thereof for the major portion of its axial dimension and opening out through the opposite unattached end thereof, a garter-type spring encircling the sleeve and exerting thereon a resilient contractual force, said garter spring being movable over the external surface of the sleeve toward either end thereof and being operable in a position adjacent to the slitted end of the sleeve to contract the sleeve onto the drive shaft thereby clamping the wheel against slidable movement and being inoperable in a position adjacent to the attached end of the sleeve to perform this action thereby enabling the wheel to slide along the shaft, and means carried by the wheel and engageable with the garter spring for moving the same along the sleeve to one or the other of said two positions.

5. The invention described in claim 4 characterized in that the sleeve is cambered to provide a greater external diameter intermediate its ends from which slopes of decreasing diameters extend toward the opopsite ends of the sleeve, each of said slopes enabling said garter spring to move itself under the influence of its contractual force toward the end of the sleeve in which direction the slope extends.

6. The invention described in claim 5 further characterized in that the means for moving the garter spring is journaled on the hub of the wheel to allow relative rotation of one with respect to the other.

7. In combination with a wheel adapted to be axially slidable mounted on a shaft, mechanism for releasably locking the wheel to the shaft against such slidable movement comprising:

a sleeve attached at one end to the wheel and shaped to closely encircle the shaft upon which the wheel is mounted, said sleeve having a plurality of circularly spaced apart slits extending longitudinally thereof for the major portion of its axial dimension and opening out through the other end thereof and further having a camber such that its external diameter is greater approximately midway of its length, and a garter-type spring encircling the sleeve and exerting thereon a resilient contractual force, said spring being shiftable over the camber of the sleeve from a position adjacent to the slitted end thereof to a position adjacent to the wheel attached end thereof and being operable in the siltted end position to contract the sleeve and thereby hold the wheel against slidable movement on the shaft upon which it is mounted whereas when the spring is shifted to the other of said positions it is ineffective to provide such clamping action thereby enabling the wheel to slide on the shaft, said spring being rollable along the sleeve and being self-operable under the influence of its contractual force to roll with a snap action to either of said two end positions from the high point of the camber.

8. The invention described in claim 7 further characterized in that means is carried by the wheel which is engageable with the garter spring for rolling the same over the high point of the sleeve's camber.

9. The inevntion described in calim 8 characterized in that the means engageable with the garter spring for rolling the same over the sleeve's camber includes a frame journaled with respect to the wheel to allow relative rotation of one with respect to the other.

10. In combination with a wheel having its hub slidably splined to a drive shaft for joint rotation therewith, a device for releasably clamping the wheel to the drive shaft against such slidable movement comprising:

a sleeve composed of flexible material secured at one end to the wheel hub and forming an axial extension thereof closely hugging the spilned shaft, said sleeve having internal splines engaging the splines of the shaft and further having slits extending longitudinally thereof for the major portion of its axial dimension and opening out through its opposite unsecured end,
a garter-type coiled spring encircling the sleeve and exerting thereon a resilient contractual force, said garter spring being shiftable over the external surface of the sleeve toward either end thereof and being operable in a position adjacent to the unsecured end of the sleeve to collapse the sleeve onto the drive shaft thereby clamping the wheel against slidable movement and being incapable in a position adjacent to the secured end of the sleeve to perform this function thereby enabling the wheel to slide along the shaft,
said sleeve being cambered to provide a greater external diameter intermediate its ends from which slopes of decreasing diameters extend toward the opposite ends of the sleeve, each of said slopes being at such an inclination that said garter spring will roll on each slope with a snap action under the influence of its contractual force toward the end of the sleeve in which direction the slope extends,
a frame journaled on the hub of the wheel to allow relative rotation of one with respect to the other, and
a finger pivoted at one end to the frame and shaped at its opposite end to straddle the garter spring and being effective upon pivotal movement to roll the garter spring in either direction over the high point of the camber of the sleeve whereupon the garter spring is self-operable to complete its movement to the position in which it is urged by the finger.

References Cited

UNITED STATES PATENTS

| | | | |
|---|---|---|---|
| 508,314 | 11/1893 | Hill | 279—41 |
| 1,072,378 | 9/1913 | Bauschlicher | 279—43UX |
| 1,658,504 | 2/1928 | Weiss | 279—43 |
| 2,526,084 | 10/1950 | Penn | 294—20 |

FOREIGN PATENTS

| | | | |
|---|---|---|---|
| 1,047,869 | 11/1966 | Great Britain | 287—52 |

DAVID J. WILLIAMOWSKY, Primary Examiner

A. KUNDRAT, Assistant Examiner